3,718,908
SIGNATURE STORAGE AND RETRIEVAL SYSTEM
Richard W. Bloomstein, 1443 Cavell,
Highland Park, Ill. 60035
Filed Nov. 30, 1970, Ser. No. 93,587
Int. Cl. H04n 7/18
U.S. Cl. 340—149 A                5 Claims

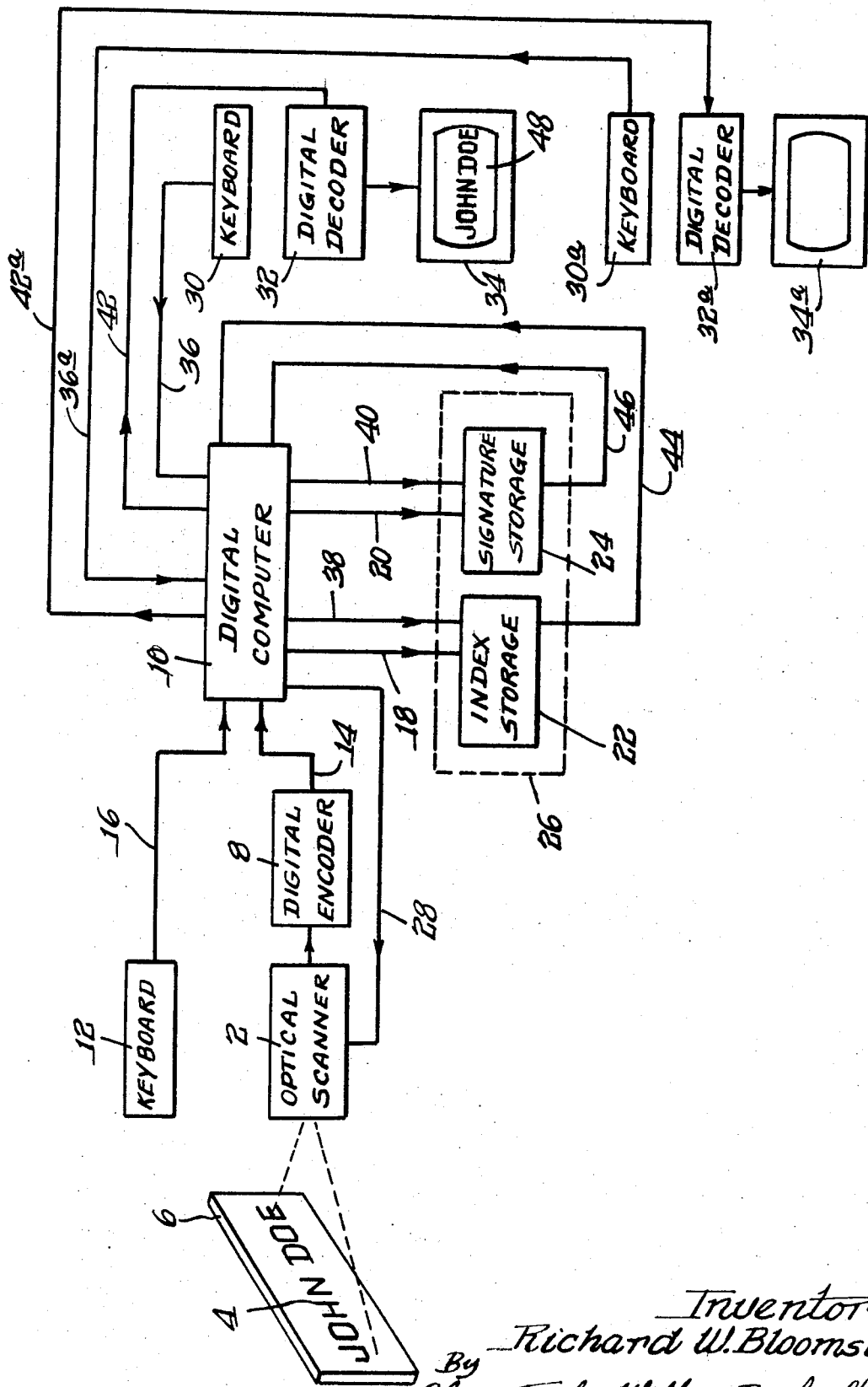

ABSTRACT OF THE DISCLOSURE

A signature storage and retrieval system comprises an arrangement where signatures are optically scanned and digitally coded, and together with digitally coded correlative information, such as bank account numbers, are stored on data processing recording media. A signature may be verified by keying into the data processing file the bank account number or other correlative information code which causes the data processing equipment to retrieve the signature data which is then decoded, and the signature is displayed on the screen of a cathode ray tube.

BACKGROUND OF THE INVENTION

This invention relates to a system for storing signature information and for retrieving and verifying such signature. In connection with banking or savings-institution transactions, it is frequently necessary to verify the signature of a party who may wish to cash a check or withdraw funds. Customarily, the bank maintains a signature card file that is available to the bank teller for signature verification purposes. In a typical transaction a bank customer will present a check or withdrawal slip to a teller, and unless the teller knows the customer personally, it is incumbent upon the teller to verify the signature. Accordingly, the teller goes to the card file, locates the signature card, compares the signature on the card with that on the withdrawal slip or check and determines whether or not the signature is proper. An arrangement of this type is exceedingly time consuming, results in customer delay, and generally requires additional tellers to be on duty during peak hours of banking activity.

In an effort to simplify or speed up this procedure it has been proposed to store a set of signature cards at a central location remote from the tellers and provide closed circuit television communication and audio communication from the central file area to each teller or group of tellers. When a teller desires to verify a signature, the teller calls through the audio communication system to someone at the central file area giving the person at the central file area the name and the account number in connection with which signature verification is sought. The person at the central file area retrieves the card and thereafter places it in front of the television camera for viewing upon the television screen of the receiver at or near the teller's window. However, an arrangement of that type is really nothing more than a refinement of the more conventional arrangement where each teller goes to a file drawer and examines the signature card proper.

OBJECTS AND SUMMARY OF THE INVENTION

It is an object of this invention to provide a computerized system for storing signature information and for retrieving such information for verification thereof in a rapid and efficient manner so as to speed up considerably the signature verification procedure over that which has been heretofore practiced in banks and saving institutions.

It is a further object of the present invention to provide a system of the type stated which is capable of recording signature information in coded form on magnetic or other data processing media as well as to retrieve on request desired signature information and display such information on a cathode ray tube whereby the signature can be viewed by the teller or other person seeking verification of the same.

It is an additional object of this invention to provide a system of the type stated in which the signature being stored is optically scanned for coding and transmission to a computer and for storage in a data bank.

It is a still further object of this invention to provide a system of the type stated which enables signatures to be added or removed with great facility so that the arrangement will always reflect changes in the signature record files.

In accordance with the foregoing objects the system of the present invention comprises a means for producing a first group of coded electrical signals representative of the signature. Preferably such means includes a device for optically scanning the signature and a digital encoder. Also provided is a means for transmitting a second group of coded electrical signals having information correlative to the first or signature-indicating signals. The correlative information may conveniently be the customer's account number. The second group of coded signals may be the digital output of a keyboard with accompanying digital code signal-producing equipment. The two groups of signals are received by a digital computer (i.e. data processing equipment) which sends signals to one or more direct access information storage devices for storing the data therein. The digital computer and direct access storage device or devices also serve in the signature-retrieving aspect of the invention. Thus, a keyboard may be utilized to send signals to the digital computer to cause the latter to retrieve the stored data and convey that data electrically and in coded form to a digital decoder. The decoder then decodes the signals and sends them to a cathode ray display device for producing a visual image of the signature.

The digital computer contains two programs for carrying out the present invention. One program consists of a signature storage and maintenance program which instructs the computer to write the digital codes for the signatures and the digital codes for the correlative data (e.g. bank account numbers) on direct access storage devices, such as magnetic discs. The program may be such that the account number data are used as an index or locating means for the signature data. Separate direct access storage devices may be used for the signature data and the index or account number data. Alternatively, a single direct access storage device may be employed utilizing different portions thereof for the two groups of data. The computer is also programmed by a signature retrieval and display program which consists essentially of instructions by which the computer searches the direct access storage devices and causes the digital code of a particular signature to be transmitted to the display device for visual display of the signature. Thus, when a keying signal representative of the bank account number corresponding to the signature is fed into the computer, the program is such that the keying signal actuates the index storage device which has in memory the location of the signature data on the signature storage device. Consequently, the signature data may be located, and the signature data sent to the computer and from there to the decoder and visual display device.

BRIEF DESCRIPTION OF DRAWING

In the drawing the figure shows a block diagram of the system constructed in accordance with and embodying the present invention.

DESCRIPTION OF THE PREFERRED EMBODIMENT

Referring to the figure there is shown an optical scanner 2 that is adapted to scan a signature 4 on a signature card 6. Document scanning is known and such may be done in a known manner. The signature card 6 may be a bank signature card or a special card for use with the system and which the bank customer signs when the account is opened or when a change in signature is made for the account. The output from the optical scanner is in analog form and proceeds to a digital encoder 8 which sends digital electronic signals to the digital computer 10. Also provided for the system is a conventional keyboard 12 which sends out digital pulses to the computer 10. The transmitting lines 14, 16 over which the digital pulses are sent may utilize conventional transmitting and/or receiving modems to provide for compatibility between the hardware items used in the system.

The output from the digital computer 10 is in electrical form over lines 18, 20 to an index storage device 22 and a signature storage device 24. As previously pointed out, theese devices may be separate or they may be discrete portions of a single storage device 26. The storage devices 22, 24 may be of any known type, preferably magnetic discs. In this regard it should be noted that a number of banks have computers "on line" during banking hours for storing account numbers correlated to account balances. Under such conditions, the index storage device 22 may already be embodied into an existing system. Thus, the added data storage hardware may be simply the additional signature storage device 24.

The digital computer 10 is, as previously pointed out, appropriately programmed for the functions necessary to carry out the storage and retrieval of signatures. This may be carried out by known computer programming techniques. Suffice it to say, however, that the computer 10 is programmed to receive account number data plus a second set of data representing the signatures. Likewise, the index storage device 22 and the signature storage device 24 are prepared for proper indexing and location functions. The signature card 6 is placed in scanning position in the optical scanner 2. Conventionally, the optical scanner 2 is constructed so that when an object to be scanned is placed therein a signal will be sent through the encoder 8 and over line 14 to the computer 10. When the computer is "ready" a scanning-command signal is sent therefrom over line 28 back to the scanner 2 causing the latter to scan the signature 4. The encoded data is sent to the computer 10 which, in turn, through the elecrical line 20 sends the coded signature data to the signature storage device 24. The keyboard 12 is then operated to send the correlative data over line 16 to the computer 10 which sends that data over electrical line 18 to the index storage 22. By reason of the programming of the computer, this index 22 will now contain data as to the location of the signature data in the device 24. The data sent out from the keyboard 12 may, as previously described, be initiated by keying in the bank account number. However, for added security it is possible to utilize a special signature number assigned to each account or even to each signature on an account.

The foregoing procedure is utilized for storing signatures either as an initial group of signatures or to provide changes in the day-to-day updating of the signature files. Accordingly, a suitable signal or signals may be issued from the keyboard 12 constituting a code for indicating that a signature is to be removed from the signature file. This signal causes the computer 10 to locate the particular index that is correlated with the signature that is to be removed from the signature storage device 24. The signal sent through the index storage device 22 thus provides an availability region on the program map. The signature code is not actually erased at that time, but when a new signature is scanned and a new account number is keyed into the computer an available space on the index storage will be used and the old coded signature correlated to that index will simply be recorded over with the new structure data.

For retrieving the signatures one or more retrieval installations may be provided. Each installation may comprise a keyboard 30, a digital decoder 32 and a cathode ray display device 34. The arrangement 30, 32, 34 may be at or adjacent to the window of a bank teller or a group of tellers. A like arrangement 30a, 34a may be at another location in the bank, for example at another teller's window or adjacent to another group of tellers. Two such installations are shown by way of example, but a greater number may be used. Moreover, each installation consisting of a keyboard 30, digital decoder 32 and display device 34 may be in another building, for instance in a branch of the main bank building.

The signature retrieval arrangement will now be described, reference being made to the devices 30, 32, 34, it being understood that each installation 30a, 32a, 34a functions in like manner. Utilizing the keyboard 30, the bank teller keys in the account number resulting in the coded data corresponding to the account number being sent over conductor 36 to the computer 10. The computer 10, acting on instructions of the signature retrieval program, issues "read" signals on conductors 38, 40 to the index storage device 22 and signature storage device 24. These devices 22, 24 then issue "data" signals over conover conductor 42 the data signals corresponding to the ductors 44, 46 back to the computer which transmits signature being retrieved to the digital decoder 32. Conductors 36a and 42a perform functions corresponding to the conductors 36, 42 for the devices 30a, 32a, 34a.

The digital decoder 32 converts the signals from the computer 10 to analog form for display of the signature on the cathode ray tube screen 48 of the display device 34. In connection with the present invention, it should be noted that the keyboards 12, 30, the digital encoder 8, digital decoder 32, optical scanner 2 and display device 34 are hardware items known in the art. They are commerically obtainable, for example, from Cognitronics Corporation, New York, N.Y., and may be of the type used in the Cognitronics System/70. It should be pointed out, however, that in the Cognitronics System the hardware has not been used in an arrangement of the type herein disclosed, but rather has been used for graphic monitoring of data at the time the data is scanned for input into the system. Thus, in the Cognitronics System, if a line of data is scanned and a particular character is not recognized by the computer, the display screen will flash the line of data and so indicate an unrecognized data character that must be manually keyed into the computer. Moreover, in the Cognitronics System a low phosphor cathode ray tube has been employed since there is no need for a relatively long time image on the screen. The present invention, however, while utilizing hardware components of the Cognitronics System employs a cathode ray tube with a higher phosphor screen. Such tubes are well known in radar devices, and may be of the type similar to those produced by Radio Corporation of America, New York, N.Y., type 3SP7A or 5BP1 or 5BP7. These high phosphor tubes permit a relatively long duration of display of the signature. Moreover the keyboard may contain a "repeat display" key by which the signature may be repeatedly displayed onto the screen 48.

It should further be pointed out that the digital computer 10 may be of a known type that is commercially available. The computer used in the System 360 produced by International Business Machines Corporation, New York, N.Y., is suitable for the present invention.

The invention is claimed as follows:

1. A system for storing signature information and for retrieving the information for verification of the signature, said system comprising means for producing a first group of coded electrical signals representative of the graphical image of a signature, said means including a device for optically scanning said signature, means for transmitting a second group of coded electrical signals having information correlative to said first group of coded signals, data processing means for receiving the two groups of signals, direct-access information storage means for receiving signals from said data processing means that represent the data of said two groups of signals and for storing a multiple assortment of said data therein, retrieving means including said data processing and said storage means for substantially reproducing a facsimile of any particular stored signature; said retrieving means further including a decoder, means for producing input signals of predetermined characteristics of said second group of coded signals into the data processing means to retrieve data from the storage means representing a particular signature and convey the data in coded form to said decoder, and a cathode ray device responsive to the decoded output of said decoder for displaying a visual image constituting a facsimile of said particular signature.

2. A system according to claim 1 in which the means for producing said first group of signals further includes a device responsive to the output of said optical scanning device for connecting analog signal data therefrom into digital form.

3. A system according to claim 1 in which the second group of signals sent to the data processor are data in digital form.

4. A system according to claim 1 in which said retrieving means comprises a plurality of individually operable means for producing said input signals to the computer, a decoder associated with each of said last-named means, and a cathode ray device as aforesaid associated with each decoder.

5. A system according to claim 1 in which there are provided means for issuing coded electrical signals to said storage means for removal of data therefrom.

References Cited

UNITED STATES PATENTS

| | | | |
|---|---|---|---|
| 3,439,986 | 4/1969 | Moore | 340—149 A |
| 3,445,633 | 5/1969 | Ratner | 340—149 A |
| 3,569,619 | 3/1971 | Simjian | 340—149 A |
| 3,181,026 | 4/1965 | Sloan | 340—324 A |
| 3,226,706 | 12/1965 | Artzt | 340—324 A |
| 3,272,918 | 9/1966 | Koll | 178—6.6 |
| 3,299,418 | 1/1967 | Treseder | 340—324 A |
| 3,347,981 | 10/1967 | Kagan | 178—5 |

HAROLD I. PITTS, Primary Examiner

U.S. Cl. X.R.

340—149 R